United States Patent Office 3,616,836
Patented Nov. 2, 1971

3,616,836
ACCELERATING WATER EVAPORATION BY THE ADDITION OF AN ORGANO-SILICON COMPOUND
Richard W. Alsgaard, Midland, Mich., assignor to Dow Corning Corporation, Midland, Mich.
No Drawing. Filed Aug. 15, 1968, Ser. No. 752,750
Int. Cl. B01d 1/00, 3/34
U.S. Cl. 159—47
25 Claims

ABSTRACT OF THE DISCLOSURE

A method for accelerating water evaporation is disclosed in which an aqueous surface is treated with an organosilicon compound. An aqueous surface having an organosilicon compound on the surface is also disclosed. An example of the organosilicon compound is

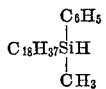

The present invention relates to a method for accelerating evaporation from aqueous surfaces and to an aqueous body in which the surface carries an evaporation accelerator.

Whereas the conservation of water is very important, there are many instances when the presence of water is undesirable. Some land cannot be cultivated because it is covered with water. Some land areas covered with water could be useful in agriculture, but for the presence of the water. This land covered with water can be reclaimed by draining off the water, but some such areas are too expensive to drain due to the surrounding terrain. Thus, other means of removing the unwanted water are desired. Water can be used for cooling purposes by taking advantage of the heat carried away by the evaporating water. Thus, the rate of evaporation will determine the amount of cooling obtained and if the rate of evaporation can be increased the water will provide a lower temperature due to its higher evaporation rate. Other situations where it is desirable to have a higher rate of evaporation include, concentration processes, distillations to obtain pure water, and the like.

Thus, it is an object of the present invention to provide a method for accelerating the evaporation of water from aqueous bodies. It is another object to provide an aqueous body with an evaporation accelerator. These and other objects will become apparent from the following detailed description of the invention.

The present invention relates to a method for accelerating water evaporation comprising dispersing on an aqueous surface, which is in contact with an atmosphere, an organosilicon compound selected from the group consisting of

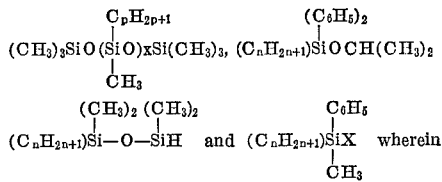

$n$ has a value of from 12 to 45 inclusive, $p$ has a value of from 16 to 20 inclusive, $x$ has a value of from 30 to 40 inclusive and X is selected from the group consisting of a chlorine atom, a hydrogen atom, a hydroxyl radical and a methoxy radical.

The present invention also relates to an evaporation accelerated body comprising an aqueous body having on an aqueous surface a dispersion of an organosilicon compound as defined in the foregoing paragraph.

The surface of an aqueous body is treated such that the defined organosilicon compounds are dispersed on the aqueous surface. Any suitable means of causing the aqueous surface to have a dispersion of the defined organosilicon compound can be used. The means for dispersing the defined organosilicon compounds can include, for example, spraying either a finely divided solid or liquid on the aqueous surface, forming an organic solvent solution for the defined organosilicon compounds wherein the organic solvent is a volatile organic solvent and then spraying, pouring or dispersing by pipes on the aqueous surface of the aqueous body and the like.

The aqueous body can be a stationary or changing body. If the aqueous body is a changing aqueous body wherein the additions or removals of part of the aqueous body are from the surface of the aqueous body additional organosilicon compounds should be added as required to maintain the desired amount on the aqueous surface, in some cases this would be continuous additions of the organosilicon compound. Where the removals from a changing aqueous body do not effect the surface, additions of the organosilicon compound are usually not required.

The organosilicon compounds useful as evaporation accelerators in the present invention include those having long chain alkyl radicals attached to the silicon atom through silicon-carbon bonds. It is completely unexpected that these organosilicon compounds would accelerate the evaporation of water. What is even more unexpected is that not all organosilicon compounds having long chain alkyl radicals will accelerate water evaporation.

The organosilicon compounds useful as evaporation accelerators include those having a formula

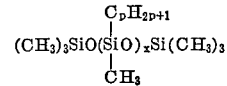

wherein $p$ has a value of from 16 to 20 inclusive and $x$ has a value of from 30 to 40 inclusive, examples include,

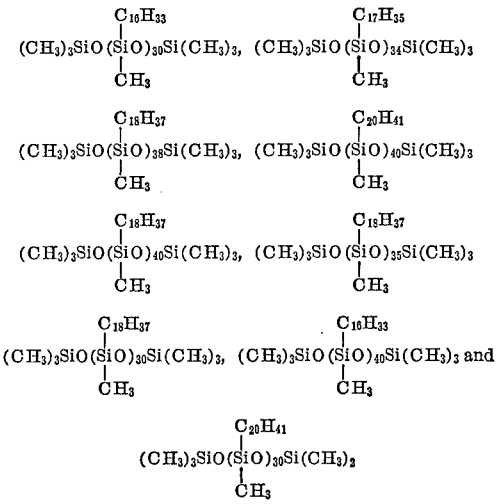

those having a formula

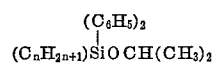

wherein $n$ has a value of from 12 to 45 inclusive, examples include,

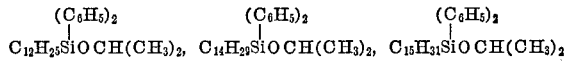

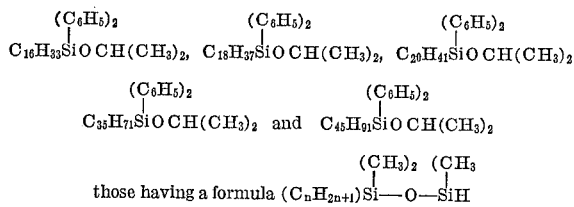

those having a formula $(C_nH_{2n+1})Si(CH_3)_2-O-SiH(CH_3)_2$ wherein $n$ has a value of from 12 to 45 inclusive, examples include,

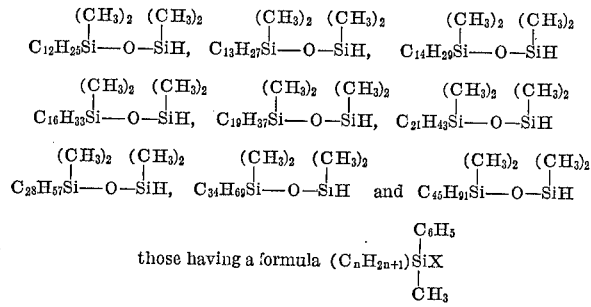

those having a formula 
$$(C_nH_{2n+1})\underset{\underset{CH_3}{|}}{\overset{\overset{C_6H_5}{|}}{Si}}X$$

wherein $n$ has a value of from 12 to 45 inclusive and X is Cl, H, —OH or —OCH₃, examples include,

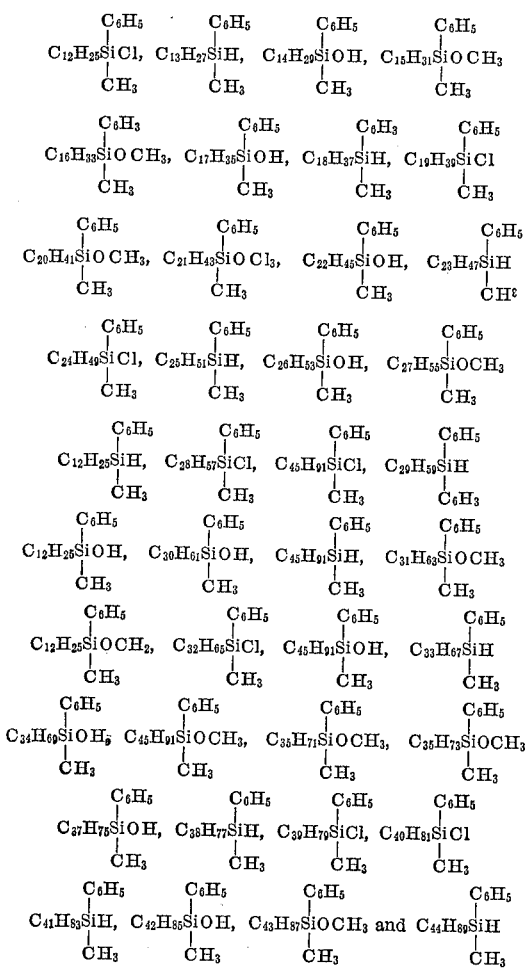

The preferred organosilicon compounds are those of the following formulae

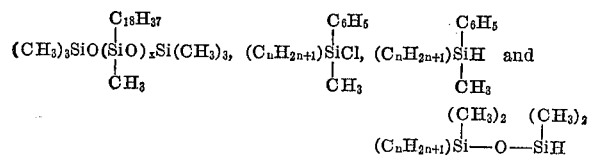

wherein $n$ has a value of from 12 to 20 and $x$ is defined above.

The organosilicon compounds can be applied to the aqueous body as single species or as mixtures of any two or more of the above defined organosilicon compounds.

The organosilicon compounds can be applied in any amount which is effective in accelerating water evaporation. It is preferred, however, that less than 0.1 g. be applied per square inch of aqueous surface. Usually not more than 0.010 g. per square inch of aqueous surface is applied for economical reasons and since any greater amount does not substantially effect the evaporation rate. Amounts greater than 0.1 g. per square inch of aqueous surface can be used, if desired.

The method of this invention is useful in accelerating the evaporation where a drying atmosphere is in contact with the surface of an aqueous body. The aqueous body can be in an open tank, a ditch, a trough, a pan, a kettle, a bowl, a barrel, a dish or a closed vessel with a drying atmosphere passing through it, or it can be a pond, a lake, a reservoir or a swamp.

By varying the amount of organosilicon compound applied to the aqueous surface, the evaporation rate can be controlled. By controlling the evaporation rate, specific cooling effects can be accomplished which are due to the evaporation process. Thus, the present method can be used to control the temperature of an aqueous body under certain conditions.

The evaporation accelerators can best be prepared by the following methods. Compounds of the formula

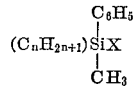

can best be prepared by reacting an α-olefin with

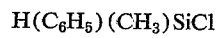

in the presence of a platinum catalyst, such as chloroplatinic acid. The resulting product has a formula

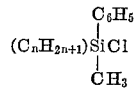

The

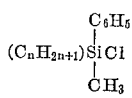

is mixed with sodium bicarbonate to produce a silanol of the formula

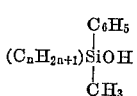

The

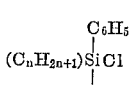

is reacted with lithium aluminum hydride to produce a silane of the formula

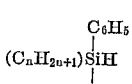

The

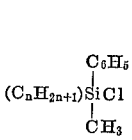

is mixed with excess methanol to produce a methoxysilane of the formula $$(C_nH_{2n+1})\underset{\underset{CH_3}{|}}{\overset{\overset{C_6H_5}{|}}{Si}}OCH_3$$

Compounds of the formula $$(C_nH_{2n+1})\overset{\overset{(C_6H_5)_2}{|}}{Si}OCH(CH_3)_2$$

can best be prepared by reacting an α-olefin with $H(C_6H_5)_2SiCl$ in the presence of a platinum catalyst, such as chloroplatinic acid. The resulting product has a formula $$(C_nH_{2n+1})\overset{\overset{(C_6H_5)_2}{|}}{Si}Cl$$

The $$(C_nH_{2n+1})\overset{\overset{(C_6H_5)_2}{|}}{Si}Cl$$

is then mixed with excess isopropanol and allowed to stand for a period of time, such as 48 hours. After the removal of any excess volatile by-products or unreacted starting materials, a product of the formula $$(C_nH_{2n+1})\overset{\overset{(C_6H_5)_2}{|}}{Si}OCH(CH_3)_2$$

is obtained.

Compounds of the formula $$(C_nH_{2n+1})\overset{\overset{(CH_3)_2}{|}}{Si}-O-\overset{\overset{(CH_3)_2}{|}}{Si}H$$

can best be prepared by reacting an α-olefin with $H(CH_3)_2SiCl$ in the presence of a platinum catalyst, such as chloroplatinic acid. The resulting product has a formula $$(C_nH_{2n+1})\overset{\overset{(CH_3)_2}{|}}{Si}Cl$$

The $$(C_nH_{2n+1})\overset{\overset{(CH_3)_2}{|}}{Si}Cl$$

and $H(CH_3)_2SiCl$ are mixed and hydrolyzed. To insure the desired end product, the $H(CH_3)_2SiCl$ is used in excess such as two moles of $H(CH_3)_2SiCl$ to one mole of the $$(C_nH_{2n+1})\overset{\overset{(CH_3)_2}{|}}{Si}Cl$$

The reaction mixture is distilled after hydrolysis to recover the product having a formula $$(C_nH_{2n+1})\overset{\overset{(CH_3)_2}{|}}{Si}-O-\overset{\overset{(CH_3)_2}{|}}{Si}H$$

An alternative method is to react one mole of an α-olefin with one mole of $[H(CH_3)_2Si]_2O$ in the presence of a platinum catalyst to obtain $$(C_nH_{2n+1})(CH_3)_2SiOSi(CH_3)_2H$$

Compound of the formula $$(CH_3)_3SiO(\underset{\underset{CH_3}{|}}{\overset{\overset{C_pH_{2p+1}}{|}}{Si}}O)_xSi(CH_3)_3$$

can best be prepared by reacting a siloxane of the formula $$(CH_3)_3SiO(\underset{\underset{CH_3}{|}}{\overset{\overset{H}{|}}{Si}}O)_xSi(CH_3)_3$$

with the appropriate α-olefin in the presence of a platinum catalyst, such as chloroplatinic acid according to the method as described in Great Britain specificaiton No. 1,041,870.

The following examples are illustrative only and should not be construed as limiting the invention which is properly delineated in the appended claims.

EXAMPLE 1

(A) In a small bottle, 11.0 g. of $H(C_6H_5)(CH_3)SiCl$ was placed and then 19.6 g. of octadecene-1 and 5 drops of a solution of one weight percent platinum as chloroplatinic acid in isopropanol was added to the silane. This bottle was closed and placed in a 100° C. oven. After two hours the reaction mixture showed no evidence of silicon-bonded hydrogen and the mixture was allowed to cool overnight. The octadecylmethylphenylchlorosilane, $(C_{18}H_{37})(C_6H_5)(CH_3)SiCl$, was recovered from the reaction mixture by distillation under reduced pressure. The refractive index, $n_D^{25}$, was 1.4864 for $$(C_{18}H_{37})(C_6H_5)(CH_3)SiCl$$

(B) two grams of $(C_{18}H_{37})(C_6H_5(CH_3)SiCl$ was placed in a small vial and dioxane added as a solvent. To the resulting solution, $LiAlH_4$ in dioxane was slowly added causing an evolution of gas and the mixture became warm. The vial was loosely capped and allowed to stand overnight. The resulting mixture was filtered to remove any excess $LiAlH_4$ and $LiCl\cdot AlCl_3$. The dioxane was stripped from the solution and the residue was mixed with water and toluene. The toluene portion was remove any excess $LiAlH_4$ and $LiCl\cdot AlCl_3$. The dioxane calcium sulfate was removed from the toluene solution by filtering and the toluene was removed by distillation. The residue was octadecylmethylphenylsilane, $$(C_{18}H_{37})(C_6H_5)(CH_3)SiH$$

having a refractive index, $n_D^{25}$, of 1.4826.

(C) Sodium bicarbonate was mixed with some of the $(C_{18}H_{37})(C_6H_5)(CH_3)SiCl$. The resulting mixture was allowed to stand with occasional stirring. Carbon dioxide evolved from the mixture which became warm. The mixture was dissolved in diethyl ether and the sodium chloride, formed in the reaction, was filtered off. The diethyl ether was evaporated and the resulting product was $(C_{18}H_{37})(C_6H_5)(CH_3)SiOH$ which had a refractive index, $n_D^{25}$ of 1.4859.

(D) Mixed $(C_{18}H_{37}(C_6H_5)(CH_3)CiCl$ with methanol and toluene and agitated the mixture for two hours. The solvents were then stripped and the resulting product was $(C_{18}H_{37})(C_6H_5)(CH_3)SiOH_3$ which had a refractive index, $n_D^{25}$, of 1.4812.

(E) A mixture of 28 g. of alpha-octadecene and 5 drops of a one weight percent platinum, added as a chloroplatinic acid in isopropanol was heated to 100° C. and then 21.8 g. of $H(C_6H_5)_2SiCl$ was added. The reaction mixture was heated for one day at 100° C., however, unreacted silicon-bonded hydrogen remained, therefore, 10 g. of the octadecene and 5 drops of the platinum catalyst were added. This mixture was heated to 150° C. and 5 more drops of the platinum solution were added and heating was continued until only a trace of silicon-bonded hydrogen could be detected. The mixture was then stripped to 160° C. pot temperature at 1 mm. of Hg. The residue of 23 g. was the product of $$\underset{\underset{C_{18}H_{37}}{|}}{(C_6H_5)_2SiCl}$$

and had a refractive index, $n_D^{25}$, of 1.5223.

The octadecyldiphenylchlorosilane was mixed with a large volume of isopropanol and allowed to stand for 2 days. The isopropanol was then removed by stripping. Isopropanol was again added and allowed to stand for a short period and then was removed by stripping. The product was octadecyldiphenylisopropoxysilane and had a refractive index, $n_D^{25}$, of 1.5090.

(F) A mixture of octadecene-1, $H(CH_3)_2SiCl$ and chloroplatinic acid was heated in a high pressure bomb. The resulting mixture was distilled and a product collected which was octadecyldimethylchlorosilane. A mixture of 1136 g. of H(CH$_3$)$_2$SiCl and 2070 g. of the octadecyl-dimethylchlorosilane was hydrolyzed. The hydrolyzed product was washed until neutral with a mixture of water and sodium bicarbonate. The resulting mixture was distilled and 1457.2 g. of

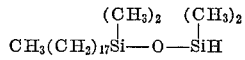

was recovered.

(G) The following solutions were prepared:

(1) A 4 weight percent solution of

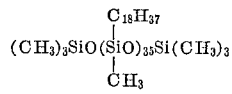

in diethyl ether.

(2) A 10 weight percent solution of $$\underset{\underset{CH_3}{|}}{\overset{\overset{C_6H_5}{|}}{C_{18}H_{37}SiCl}}$$

in diethyl ether.

(3) A 10 weight percent solution of $$\underset{\underset{CH_3}{|}}{\overset{\overset{C_6H_5}{|}}{C_{18}H_{37}SiH}}$$

in diethyl ether.

(4) A 10 weight percent solution of $$\underset{\underset{CH_3}{|}}{\overset{\overset{C_6H_5}{|}}{C_{18}H_{37}SiOH}}$$

in diethyl ether.

(5) A 10 weight percent solution of $$\underset{\underset{CH_3}{|}}{\overset{\overset{C_6H_5}{|}}{C_{18}H_{37}SiOCH_3}}$$

in diethyl ether.

(6) A 10 weight percent solution of $$\underset{}{\overset{\overset{(C_6H_5)_2}{|}}{C_{18}H_{37}SiOCH(CH_3)_2}}$$

in diethyl ether, and (7) A 10 weight percent solution of

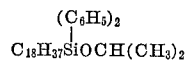

in diethyl ether.

On the surface of 100 g. of tap water in seven 250 ml. stainless steel cups, 0.2 g. of each solution was placed in a cup. The amount of silicon compound on the surface of the water of each cup was 0.02 g., except the

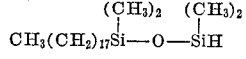

was 0.008 g.

The surface area of the water exposed to the atmosphere was 5.9 sq. in. The resulting assembly was placed in a controlled atmosphere of 65% relative humidity and 68° F. The weight of the cup, water and silicon compound solution was initially made and then observed at time intervals of 1 day, 2 days, 5 days and 7 days. A control cup was also placed in the controlled atmosphere. The control was prepared as above, but without the silicon compound solution. Ten weight percent solutions of the following silicon compounds in diethyl ether were prepared (8) $\underset{}{\overset{\overset{(CH_3)_2}{|}\phantom{xx}\overset{(CH_3)_2}{|}}{CH_3(CH_2)_{17}Si-O-SiOH}}$ (9) $\underset{}{\overset{\overset{(C_6H_5)_2}{|}\phantom{xx}\overset{O}{\|}}{C_{18}H_{37}SiO-CCH_3}}$

(10) $\underset{}{\overset{\overset{(C_6H_5)_2}{|}}{C_{18}H_{37}SiOCH_3}}$

(11) $\underset{\underset{CH_3}{|}}{\overset{\overset{C_6H_5}{|}\phantom{xx}\overset{O}{\|}}{C_{18}H_{37}SiO-CCH_3}}$ These solutions (8–11) were used as a comparison to show the unique properties of this methd.

The results below are the weight percentages of water lost in a given period under the test conditions.

| | Compound | Percent water loss after— | | | | Percent increase over control |
|---|---|---|---|---|---|---|
| | | 1 day | 2 days | 5 days | 7 days | |
| 1 | Control | 7.3 | 14.7 | 35.0 | 47.2 | |
| 2 | (CH$_3$)$_3$SiO(SiO)$_{35}$Si(CH$_3$)$_3$ with C$_{18}$H$_{37}$ and CH$_3$ | 9.9 | 20.2 | 47.9 | 64.8 | 37.3 |
| 3 | C$_{18}$H$_{37}$SiCl with C$_6$H$_5$ and CH$_3$ | 12.5 | 26.7 | 57.0 | 74.0 | 56.8 |
| 4 | C$_{18}$H$_{37}$SiH with C$_6$H$_5$ and CH$_3$ | 13.3 | 28.6 | 59.3 | 79.0 | 67.4 |
| 5 | C$_{18}$H$_{37}$SiOH with C$_6$H$_5$ and CH$_3$ | 8.3 | 16.3 | 39.8 | 54.3 | 15.0 |
| 6 | C$_{18}$H$_{37}$SiOCH$_3$ with C$_6$H$_5$ and CH$_3$ | 6.0 | 16.2 | 40.7 | 55.7 | 18.0 |
| 7 | C$_{18}$H$_{37}$SiOCH(CH$_3$)$_2$ with C$_6$H$_5$ and C$_6$H$_5$ | 6.9 | 15.5 | 35.9 | 52.4 | 11.0 |

TABLE—Continued

| Compound | Percent water loss after— | | | | Percent increase over control |
|---|---|---|---|---|---|
| | 1 day | 2 days | 5 days | 7 days | |
| 8 — $CH_3(CH_2)_{17}\underset{\underset{CH_3}{|}}{\overset{\overset{CH_3}{|}}{Si}}O—\underset{\underset{CH_3}{|}}{\overset{\overset{CH_3}{|}}{Si}}H$ | 8.9 | 17.3 | 44.9 | 65.1 | 37.9 |
| 9 — $CH_3(CH_2)_{17}\underset{\underset{CH_3}{|}}{\overset{\overset{CH_3}{|}}{Si}}O—\underset{\underset{CH_3}{|}}{\overset{\overset{CH_3}{|}}{Si}}OH$ | 4.5 | 10.4 | 31.7 | 44.1 | −6.6 |
| 10 — $C_{18}H_{37}\underset{\underset{C_6H_5}{|}}{\overset{\overset{C_6H_5}{|}}{Si}}O—\overset{\overset{O}{\|}}{C}CH_3$ | ...... | 6.7 | 25.8 | 39.2 | −16.9 |
| 11 — $C_{18}H_{37}\underset{\underset{C_6H_5}{|}}{\overset{\overset{C_6H_5}{|}}{Si}}OCH_3$ | 5.4 | 12.1 | 27.2 | 40.7 | −13.7 |
| 12 — $C_{18}H_{37}\underset{\underset{CH_3}{|}}{\overset{\overset{C_6H_5}{|}}{Si}}O—\overset{\overset{O}{\|}}{C}CH_3$ | ...... | 4.9 | 18.8 | 29.4 | −37.7 |

EXAMPLE 2

When any of the following compounds are dispersed on the surface of a pond by spraying in an amount of 0.01 g. of the compound per square inch of water surface, the rate evaporation is increased.

(a) 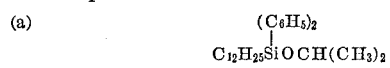

(b) 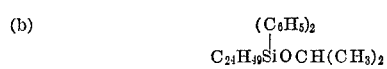

(c) 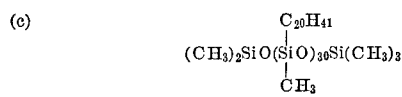

(d) 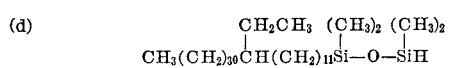

(e) 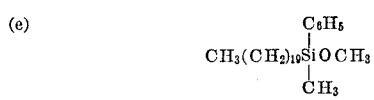

(f) 

(g) 

(h) 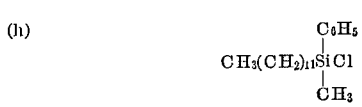

(i) 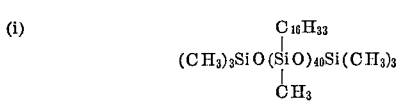

(j) 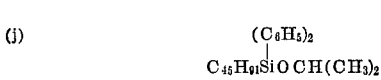

EXAMPLE 3

When any of the following compounds are dispresed on the surface of an insect breeding pool in an amount of 0.1 g. per square inch, the rate of evaporation increases.

(a) 

(b) 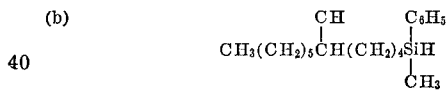

(c) 

(d) 

(e) a mixture of 20 parts by weight of

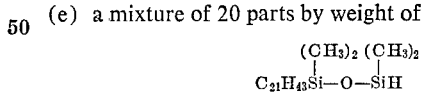

20 parts by weight of

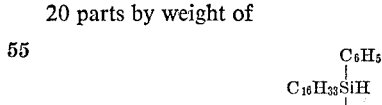

and 20 parts by weight of

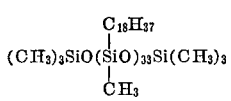

(f) 

(g) a mixture of 40 parts by weight of

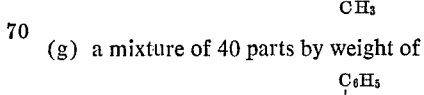

and 30 parts by weight of $$(C_{20}H_{41})\underset{\underset{\displaystyle CH_3)_2}{|}}{Si}-O-\underset{\underset{\displaystyle (CH_3)_2}{|}}{Si}H$$

That which is claimed is:
1. A method for accelerating water evaporation comprising dispersing on an aqueous surface, which is in contact with an atmosphere, an organosilicon compound selected from the group consisting of $$(CH_3)_3SiO(\underset{\underset{\displaystyle CH_3}{|}}{\overset{\overset{\displaystyle C_pH_{2p+1}}{|}}{Si}}O)_xSi(CH_3)_3, \quad (C_nH_{2n+1})\underset{}{\overset{\overset{\displaystyle (C_6H_5)_2}{|}}{Si}}OCH(CH_3)_2$$

$$(C_nH_{2n+1})\underset{\underset{\displaystyle (CH_3)_2}{|}}{Si}-O-\underset{\underset{\displaystyle (CH_3)_2}{|}}{Si}H \quad \text{and} \quad (C_nH_{2n+1})\underset{\underset{\displaystyle CH_3}{|}}{\overset{\overset{\displaystyle C_6H_5}{|}}{Si}}X$$

wherein $n$ has a value of from 12 to 45 inclusive, $p$ has a value of from 16 to 20, $x$ has a value of from 30 to 40 inclusive and X is selected from the group consisting of a chlorine atom, a hydrogen atom, a hydroxyl radical and a methoxy radical.

2. The method according to claim 1 in which the amount of organosilicon compound per square inch of aqueous surface is less than 0.1 gram.

3. The method according to claim 1 in which the evaporation of the water is accelerated by dispersing and maintaining an evaporation accelerator film of the organosilicon compound on the aqueous surface.

4. The method according to claim 3 in which the amount of organosilicon compound per square inch of aqueous surface is less than 0.01 gram.

5. The method according to claim 1 in which the organosilicon compound is in an organic solvent for the organosilicon compound.

6. The method according to claim 5 in which the organic solvent is a volatile organic solvent.

7. The method according to claim 1 in which the organosilicon compound has a formula $$(CH_3)_3SiO(\underset{\underset{\displaystyle CH_3}{|}}{\overset{\overset{\displaystyle C_pH_{2p+1}}{|}}{Si}}O)_xSi(CH_3)_3$$

8. The method according to claim 7 in which $p$ is 18.
9. The method according to claim 8 in which $x$ is 35.
10. The method according to claim 1 in which the organosilicon compound has a formula $$(C_nH_{2n+1})\underset{}{\overset{\overset{\displaystyle (C_6H_5)_2}{|}}{Si}}OCH(CH_3)_2$$

11. The method according to claim 10 in which $n$ is 18.

12. The method according to claim 1 in which the organosilicon compound has a formula $$(C_nH_{2n+1})\underset{\underset{\displaystyle (CH_3)_2}{|}}{Si}-O-\underset{\underset{\displaystyle (CH_3)_2}{|}}{Si}H$$

13. The method according to claim 12 in which $n$ has a value of from 12 to 20 inclusive.
14. The method according to claim 13 in which $n$ is 18.
15. The method according to claim 1 in which the organosilicon compound has a formula $$(C_nH_{2n+1})\underset{\underset{\displaystyle CH_3}{|}}{\overset{\overset{\displaystyle C_6H_5}{|}}{Si}}X$$

16. The method according to claim 15 in which X is a chlorine atom.
17. The method according to claim 16 in which $n$ has a value of 12 to 20 inclusive.
18. The method according to claim 17 in which $n$ is 18.
19. The method according to claim 15 in which X is a hydrogen atom.
20. The method according to claim 19 in which $n$ has a value of from 12 to 20 inclusive.
21. The method according to claim 20 in which $n$ is 18.
22. The method according to claim 15 in which X is a hydroxyl radical.
23. The method according to claim 22 in which $n$ is 18.
24. The method according to claim 15 in which X is a methoxy radical.
25. The method according to claim 24 in which $n$ is 18.

References Cited

UNITED STATES PATENTS

| | | | |
|---|---|---|---|
| 2,486,162 | 10/1949 | Hyde | 260—448.2 |
| 3,138,546 | 6/1964 | Muller | 203—10 |
| 3,154,460 | 10/1964 | Graner et al. | 14—67 |
| 3,220,934 | 11/1965 | Berejick | 203—10 |
| 3,279,527 | 10/1966 | Hardy | 159—47 |
| 3,282,327 | 11/1966 | Hardy et al. | 159—47 |
| 3,290,231 | 12/1966 | Ries et al. | 203—10 |
| 3,361,186 | 1/1968 | Wildi et al. | 203—10 |
| 3,361,645 | 1/1968 | Bodell | 203—10 |
| 3,441,075 | 4/1969 | Wildi et al. | 203—10 |
| 3,475,282 | 10/1969 | Hamilton | 159—47 |

WILBUR L. BASCOMB, JR., Primary Examiner

U.S. Cl. X.R.

159—1S; 23—307; 203—10, 100 DIG. 1; 260—448.2